March 15, 1932. A. F. SULZER 1,849,320

MOTION PICTURE AND SOUND FILM AND METHOD OF PREPARING SAME

Filed March 30, 1929

INVENTOR
ALBERT F. SULZER
BY
ATTORNEY

Patented Mar. 15, 1932

1,849,320

UNITED STATES PATENT OFFICE

ALBERT F. SULZER, OF ROCHESTER, NEW YORK, ASSIGNOR TO EASTMAN KODAK COMPANY, OF ROCHESTER, NEW YORK, A CORPORATION OF NEW YORK

MOTION PICTURE AND SOUND FILM AND METHOD OF PREPARING SAME

Application filed March 30, 1929. Serial No. 351,242.

This invention relates to a film for use in the reproduction of synchronized sound and motion pictures and a method of making it.

In order to present certain pleasing effects in connection with the reproduction of motion pictures, it has become the practice to employ various tinted films but it has been found that certain of these tints now in use seriously interfere with the reproduction of sound records formed on such films because so much of the light is absorbed thereby.

In my Patent No. 1,717,815, granted June 18, 1929 it was, therefore, proposed to apply the tinting or coloring only to the picture areas of the film while leaving the sound record portion thereof uncolored. However, it has been found that under certain conditions the solvent of the tint or dye tends to cause the parts of the film to which it has been applied to shrink while the untinted sound portion of the record does not shrink, with the result that the film may become warped or twisted.

In accordance with the present invention I propose to overcome this difficulty by treating the untinted portion of the surface of the film with a clear solvent which affects that portion in the same way as the solvent for the dye affects the remainder of the film surface.

Figure 1:
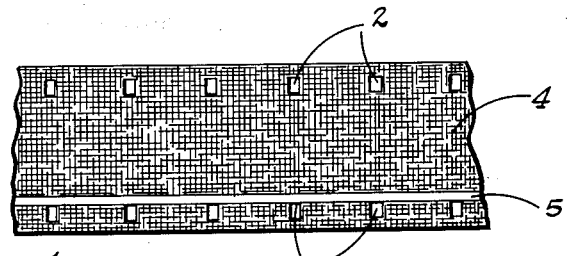
Figure 2:
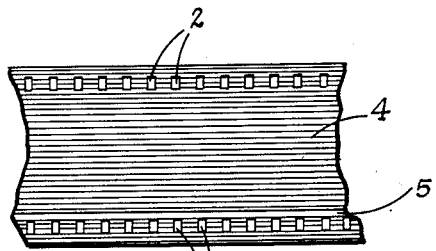
Figure 3:
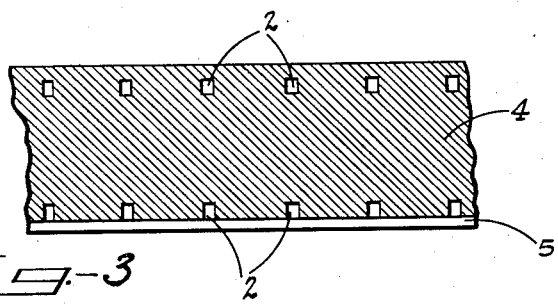
Figure 4:
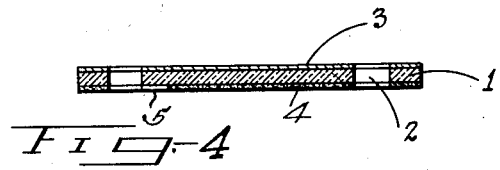

For a clearer understanding of the invention reference is made to the accompanying drawings in which Figs. 1, 2 and 3 are respective views of films embodying different forms of my invention. Fig. 4 is a section of Fig. 1 showing a preferred form.

The present invention is shown embodied in a film in the form of a long strip such as is used in the synchronized reproduction of sound and motion pictures and includes a support 1 formed preferably of plastic composition such as cellulosic material. This support is provided with perforations 2 along its border and carries on one of its surfaces a sensitized emulsion 3. During the process of manufacturing the film a layer 4 formed of coloring material is applied to the rear surface of the picture area only of the support. This layer comprises a dye in a solvent which penetrates the material of the film support to an extent greater than the ordinary photographic process or bath so that for photographic or projection purposes the dye is permanent. Since the dye solvent is applied to all of the surface of the film support except the sound record portion 5 and since it dissolves the film support surface in penetrating the material as just described, there is a tendency for the tinted portion of the film to shrink while the untreated sound portion remains unaffected. Because of this unequal shrinkage, it sometimes happens that such film becomes warped or twisted resulting in poor reproduction on the screen. In following the present invention the entire surface of the film is treated in a way to overcome this objectionable warping. I have found that this difficulty may be substantially obviated by applying a clear solvent to the untinted sound record portion 5 of the film either before or after the tinting operation. This solvent, which may be methyl alcohol alone; or ethyl alcohol, methyl alcohol and acetone; or pure amyl acetate; or preferably a solution of 95% methyl alcohol and 5% acetone, should be adjusted so that its power to attack or dissolve the film will be approximately the same as the solvent used in the tinting operation. This results in uniform shrinkage throughout the whole area of the film.

In Fig. 1 the invention is shown applied to small sized films such as are used in portable projectors for amateur and home use where but one perforation of a series is provided for each picture area while in Fig. 2 the invention is shown incorporated in a standard film for commercial uses where four perforations of each series are provided for each picture area. In the modifications of these two figures the sound record portion 5 is shown between and adjacent to one of the series of perforations 2 while in Fig. 3 the untinted sound record 5 is shown at the extreme margin of the film outside of the perforations so that the entire area between the perforations provides a colored area which may be used exclusively for motion picture exposure fields. It is to be understood that in Fig. 4 the thickness of the dye layer is shown on a greatly magnified scale, since this is an exceedingly thin layer directly carried by the solvent into the support.

It will be understood that the present disclosure is for purposes of illustration only and that this invention is intended to include all modifications and equivalents which fall within the scope of the appended claims.

What I claim is:

1. A film strip for the simultaneous reproduction of motion pictures in a single color and of sound, comprising a flexible, transparent photographic band having a longitudinally extending area constituting a series of exposure fields, and parallel thereto, a longitudinal area constituting a sound record field, the film being colored uniformly over said first area with a material that is unaffected by photographic processes but which attacks the surface of said area, and being uncolored over said second area, said second area being treated with an uncolored material which similarly attacks its surface.

2. A film strip for the simultaneous reproduction of motion pictures in a single color and of sound comprising a light transmitting flexible support having upon one surface a photographic layer, an area of uniform width extending longitudinally of the strip and uniformly colored with a material that is unaffected by photographic baths and constituting a series of motion picture exposure fields, said material affecting the surface of the area to which it is applied whereby there is a tendency for the film strip to become distorted, and a second, uncolored, area of uniform width extending longitudinally of said strip parallel to the first area and constituting a sound record area, said record area being treated with a material which prevents the mentioned distortion of said film strip.

3. A film for the simultaneous reproduction of motion pictures of a single color with audible accompaniment, the film being in the form of a long continuous band comprising a support of transparent cellulosic compound having upon the surface a uniform sensitive emulsion and having the greater part of the other surface colored with a dye that penetrates into the support to a greater extent than ordinary photographic bath, said dye affecting the surface to which it is applied so that here is a tendency for said film to be distorted, and a narrow uncolored area of uniform width extending longitudinally of the band parallel to the first area, said last mentioned area being treated with a material which tends to prevent the mentioned distortion, the color areas of the film constituting a series of photographic motion picture exposure fields and the uncolored area constituting a sound record area.

4. In connection with a film strip for the simultaneous reproduction of motion pictures in a single color and of sound comprising a flexible light transmitting photographic band having a longitudinally extending area constituting a picture record area colored with a single dye which tends to shrink the surface to which it is applied and a second longitudinally extending uncolored area constituting a sound record area, the method of preventing distortion in the film strip due to said shrinkage which comprises treating the surface of said second area without tinting it to cause it to shrink uniformly with said first mentioned area.

5. In connection with a film strip for the simultaneous reproduction of motion pictures in a single color and of sound comprising a flexible light transmitting photographic band having a longitudinally extending area constituting a picture record area colored with a single dye which tends to shrink the surface to which it is applied and a second longitudinally uncolored area constituting a sound record area, the method of preventing distortion in the film strip due to said shrinkage which comprises applying to the surface of said second area a material which, except as to light transmitting properties, affects said surface causing it to shrink uniformly with said first mentioned area.

6. In connection with a film strip for the simultaneous reproduction of motion pictures in a single color and of sound, comprising a flexible light transmitting photographic band having a longitudinally extending area constituting a picture record area colored by a single dye in a solvent which tends to shrink the surface to which it is applied, and a second longitudinally uncolored area constituting a sound record area, the method of preventing distortion in the film strip due to said shrinkage which comprises applying to the surface of said second area a solvent which attacks said surface causing it to shrink uniformly with the surface of said first mentioned area.

7. The method of preventing buckling in the making of a sheet of cellulosic film with colored and uncolored areas that comprises submitting that portion of the sheet to be colored to a dye bath including a solvent for the film material and submitting that portion of the sheet that is to remain uncolored to a bath free from dye but including a material having for the film material solvent properties analogous to those of the dye bath.

Signed at Rochester, New York, this 25th day of March, 1929.

ALBERT F. SULZER.